(12) United States Patent
Kaneko

(10) Patent No.: US 6,917,460 B2
(45) Date of Patent: Jul. 12, 2005

(54) IMAGING APPARATUS AND CONTROLLING METHOD THEREOF

(75) Inventor: Shinji Kaneko, Kokubunji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/701,438

(22) Filed: Nov. 6, 2003

(65) Prior Publication Data

US 2004/0207901 A1 Oct. 21, 2004

(30) Foreign Application Priority Data

Nov. 12, 2002 (JP) .................................. 2002-327693
Nov. 18, 2002 (JP) .................................. 2002-333101

(51) Int. Cl.[7] .............................................. G02B 26/00
(52) U.S. Cl. ................................. 359/290; 359/291
(58) Field of Search ............................ 359/290–295, 359/605, 846–850, 862, 863, 877

(56) References Cited

U.S. PATENT DOCUMENTS 6,747,813 B2 * 6/2004 Wakai et al. ............... 359/726
6,791,741 B2 * 9/2004 Hishioka .................... 359/291
2003/0214734 A1 * 11/2003 Nishioka et al. ............ 359/846

FOREIGN PATENT DOCUMENTS

| JP | 11-317894 | 11/1999 |
| JP | 2002-122784 | 4/2002 |

* cited by examiner

*Primary Examiner*—Georgia Epps
*Assistant Examiner*—M. Hasan
(74) *Attorney, Agent, or Firm*—Westerman, Hattori, Daniels & Adrian, LLP

(57) ABSTRACT

Disclosed herein is an imaging apparatus including: a variable configuration mirror provided with a reflecting surface for changing optical path and a plurality of electrodes on which voltage is applied to change the configuration of the reflecting surface; an image taking section having the variable configuration mirror as a part of its optical system; and a control section for driving the variable configuration mirror by applying voltage only on one part of the plurality of electrodes provided on the variable configuration mirror.

43 Claims, 11 Drawing Sheets

FIG. 1A PRIOR ART   FIG. 1B PRIOR ART
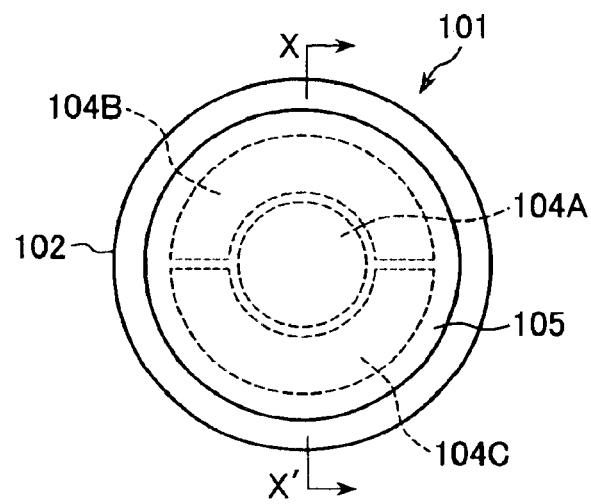
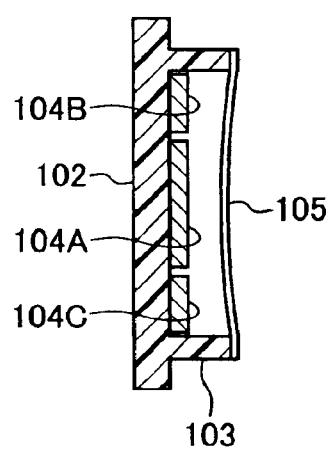
FIG. 2 PRIOR ART
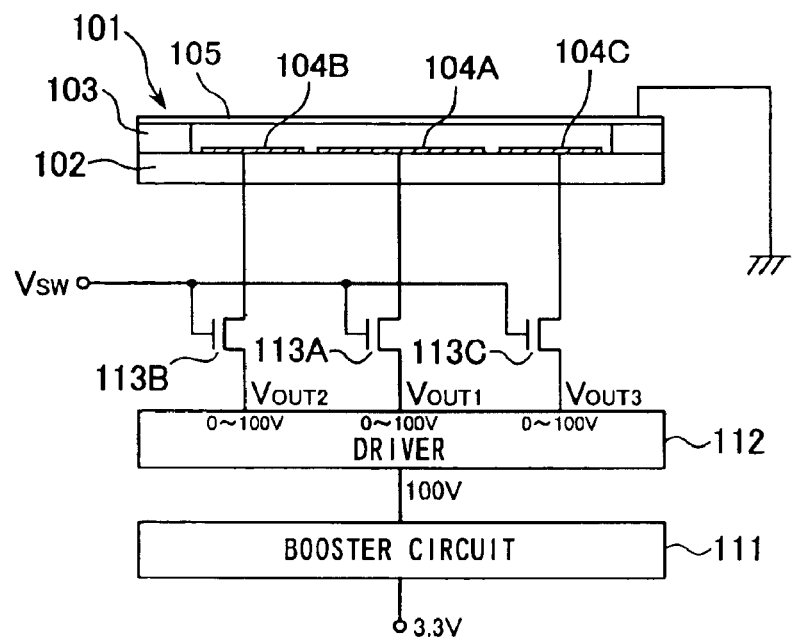

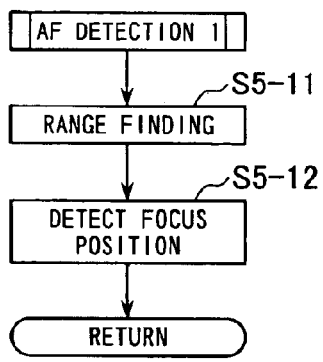
FIG. 7A
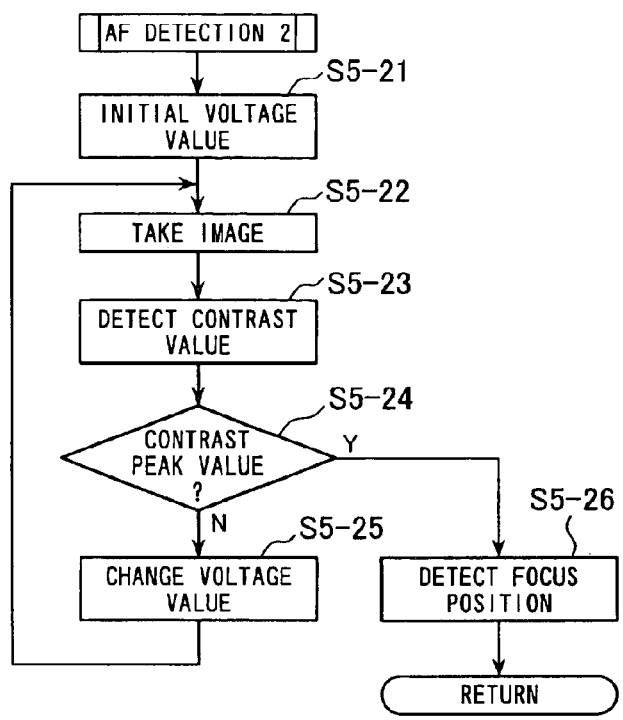
FIG. 7B
FIG. 8
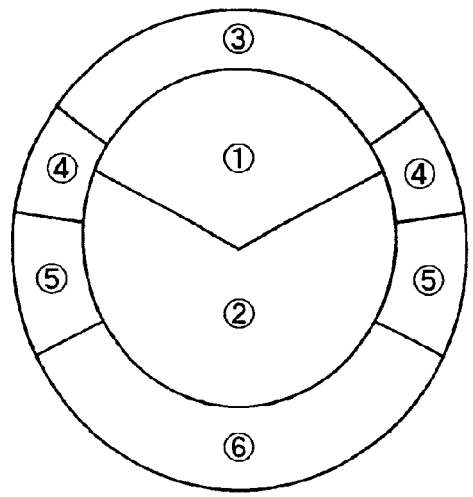

IMAGING APPARATUS AND CONTROLLING METHOD THEREOF

This application claims benefit of Japanese Patent Applications No.2002-327693 filed in Japan on Nov. 12, 2002 and No.2002-333101 filed in Japan on Nov. 18, 2002, the contents of which are incorporated by this reference.

BACKGROUND OF THE INVENTION

The present invention relates to imaging apparatus and controlling method thereof having an optical system using the characteristics of a variable configuration mirror (also referred to as deformable mirror or flexible mirror).

Generally, the entire size and performance of an imaging equipment such as a camera or display equipment are likely to depend on its optical system. In order to improve performance not only of a camera but also of other imaging equipment or display equipment, especially to improve the performance concerning downsizing and power saving, therefore, the optical system is always required to be reduced in size and power consumption. Such demands are intense especially in the field of digital camera and mobile phone's camera unit, i.e., digital imaging equipment. Variable configuration mirrors have been proposed for example in Japanese patent application laid-open No.11-317894 and Japanese patent application laid-open No.2002-122784 as the means for achieving a reduction in size and power consumption of the optical system.

An example of the variable configuration mirrors proposed in the abovementioned documents will now be described by way of FIGS. 1A and 1B. FIG. 1A is a top view, and FIG. 1B is a sectional view along X–X' of FIG. 1A. As shown in FIGS. 1A and 1B, a variable configuration mirror 101 has a ring-like support wall (spacer) 103 projected from one end surface of a disk-like base plate 102, and fixed electrodes consisting of one center electrode (first electrode) 104A and two peripheral electrodes (second and third electrodes) 104B, 104C are disposed within a region surrounded by the ring-like support wall 103. A peripheral portion of a mirror body (movable electrode) 105 is then joined and fixed to the opening end of the ring-like support wall 103.

The two peripheral electrodes 104B, 104C each are made of an electrode plate in the form of a half circular arc disposed substantially in a 180-degree angular range. The center electrode 104A is formed as a disk-like electrode plate disposed within the circular region occurring at the center portion of the two peripheral electrodes 104B, 104C. It should be noted that the fixed electrodes are made for example of chromium and that the pattern thereof is not limited to the one illustrated and various other forms can be suitably used. The mirror body 105 is formed for example such that aluminum serving as both a movable electrode and a reflecting member (mirror surface) is adhered to an outer surface of a circular disk which is formed of a polyimide resin.

When a predetermined voltage is applied between the fixed electrodes (104A to 104C) and the movable electrode (mirror body 105) of thus constructed variable configuration mirror 101, the curved configuration of the reflecting surface (mirror body 105) is variably controlled by the electrostatic force thereof. Accordingly, the voltage is controlled from an external source so as to result in a suitable curvature of the reflecting surface.

A description will now be given by way of FIG. 2 with respect to an example of the construction of a drive section of thus constructed variable configuration mirror. Referring to FIG. 2: numeral 111 denotes a booster circuit for increasing a power supply voltage (3.3V for example) to a maximum voltage (100V for example) to be applied to the fixed electrodes of the variable configuration mirror; and numeral 112 denotes a driver for setting the respective application voltages to the fixed electrodes (first to third electrodes 104A to 104C) of the variable configuration mirror, constituted in this example by three driver circuits so as to be able to drive the variable configuration mirror 101 which has three fixed electrodes. Numerals 113A to 113C denote first to third switching devices each constituted by FET, connected at one end thereof to the output $V_{OUT1}$ to $V_{OUT3}$ of the respective driver circuits and at the other end thereof to the respective fixed electrodes 104A to 104C of the variable configuration mirror 101.

In thus constructed drive section, ON/OFF of each switching device 113A to 113C is controlled by control voltage $V_{SW}$ to be commonly applied on the control terminals of the respective switching devices 113A to 113C. When the switching devices 113A to 113C are controlled to be ON, voltages $V_{OUT1}$ to $V_{OUT3}$ set at the respective driver circuits are applied on the respective fixed electrodes 104A to 104C so that the movable electrode (mirror body) can be variably controlled to a predetermined curved configuration.

Thus constructed variable configuration mirror is disposed within the optical system of a camera so that the curvature of the mirror body can be changed by controlling the applied voltage to adjust focal length thereof. It should be noted that the shape of the mirror body is not limited to a circular form, and an oval can also be used. The variable configuration mirror constructed as described has two distinct features: it is smaller in size and consumes less power as compared to the conventional lens optical system to be driven by motor; and, while a large motor sound and noise at transmitting system are caused in the conventional motor-driven lens optical system, the variable configuration mirror is substantially soundless.

SUMMARY OF THE INVENTION

It is an object of the present invention to provide an imaging apparatus and controlling method thereof in which control is effected to more efficiently use the feature of a variable configuration mirror that it consumes less power.

In a first aspect of the invention, there is provided an imaging apparatus including: a variable configuration mirror provided with a reflecting surface for changing optical path and a plurality of electrodes on which voltage is applied to change the configuration of the reflecting surface; an image taking section having the variable configuration mirror as a part of the optical system thereof; and a control section for driving the variable configuration mirror by applying voltages only on one part of the plurality of electrodes provided on the variable configuration mirror.

In a second aspect of the invention, there is provided an imaging apparatus including: a variable configuration mirror provided with a reflecting surface for changing optical path and a plurality of electrodes on which voltage is applied to change the configuration of the reflecting surface; an image taking section having the variable configuration mirror as a part of the optical system thereof; and a control section for selectively effecting control for driving the variable configuration mirror by applying voltages only on one part of the plurality of electrodes provided on the variable configuration mirror or control for driving the variable configuration mirror by applying voltages on all of the plurality of electrodes provided on the variable configuration mirror. The control section drives the variable configuration mirror in a manner chosen between the partial-electrode voltage application and the all-electrode voltage application.

The imaging apparatus according to the second aspect may employ a construction where the control section drives the variable configuration mirror by applying voltages only on a part of the electrodes at the time of a specific operation of the imaging apparatus.

In the imaging apparatus according to the second aspect, it is possible that the variable configuration mirror is to adjust focus in the image taking section correspondingly to the configuration of the reflecting surface and that the time of the specific operation is the time of a detecting operation for detecting focus position while varying the configuration of the reflecting surface.

In the imaging apparatus according to the second aspect, it is possible that the time of the specific operation is the time during which the imaging apparatus is in the condition of at least one of a through (monitor) image displaying or a moving image taking.

The imaging apparatus according to the first or second aspect may employ a construction where the control section applies voltage only on a part including at least a center electrode of the plurality of electrodes when voltage is to be applied only on a part of the electrodes.

The imaging apparatus according to the second aspect may employ a construction where the control section drives the variable configuration mirror by applying voltages on all the electrodes when taking image.

The imaging apparatus according to the second aspect may employ a construction where the control section drives the variable configuration mirror by applying voltages on all the electrodes when taking still image.

The imaging apparatus according to the second aspect may employ a construction where, when an instruction for start of image taking is given after focus position is detected by voltage application only on a part of the electrodes, the control section drives the variable configuration mirror by applying voltages on all the electrodes so as to result in the detected focus position.

In a third aspect of the invention, there is provided a controlling method of imaging apparatus including a variable configuration mirror provided with a reflecting surface for changing optical path and a plurality of electrodes on which voltage is applied to change the configuration of the reflecting surface, and an image taking section having the variable configuration mirror as a part of the optical system thereof, including the step of effecting control so as to apply voltage only on one part of the plurality of electrodes provided on the variable configuration mirror.

In a fourth aspect of the invention, there is provided a controlling method of imaging apparatus including a variable configuration mirror provided with a reflecting surface for changing optical path and a plurality of electrodes on which voltage is applied to change the configuration of the reflecting surface, and an image taking section having the variable configuration mirror as a part of the optical system thereof for use in focusing, including the steps of: effecting control so as to apply voltage only on one part of the plurality of electrodes at the time of focusing; and effecting control so as to apply voltage on all of the plurality of electrodes at the time of taking image.

In a fifth aspect of the invention, there is provided an imaging apparatus including: a variable configuration mirror provided with a reflecting surface for changing optical path and a plurality of electrodes on which voltage is applied to change the configuration of the reflecting surface; an image taking section having the variable configuration mirror as a part of the optical system thereof; a plurality of drive sections for applying voltages on the plurality of electrodes provided on the variable configuration mirror; and a control section for effecting control so as to apply a voltage commonly to at least two electrodes of the plurality of electrodes by at least one drive section of the plurality of drive sections.

The imaging apparatus according to the fifth aspect may employ a construction where the control section, during the time of a specific operation of the imaging apparatus, effects control so as to apply a voltage on all the electrodes of the plurality of electrodes by one drive section of the plurality of drive sections.

In the imaging apparatus according to the fifth aspect, it is possible that the time of the specific operation is the time during which the image taking section is being adjusted of focus by change in the configuration of the reflecting surface of the variable configuration mirror.

In a sixth aspect of the invention, there is provided an imaging apparatus including: a variable configuration mirror provided with a reflecting surface for changing optical path and a plurality of electrodes on which voltage is applied to change the configuration of the reflecting surface; an image taking section having the variable configuration mirror as a part of the optical system thereof; a plurality of drive sections for applying voltages on the plurality of electrodes provided on the variable configuration mirror; and a control section for conditionally selecting the drive sections corresponding to each electrode of the plurality of electrodes.

The imaging apparatus according to the sixth aspect may employ a construction where, depending on at least one of zoom ratio or image taking mode or recording resolution set of the imaging apparatus, the control section switches drive section for at least one electrode from the usual drive section of the one electrode to the usual drive section of another electrode so as to drive a plurality of electrodes by using the drive section of the another electrode.

In a seventh aspect of the invention, there is provided a controlling method of imaging apparatus including a variable configuration mirror provided with a reflecting surface for changing optical path and a plurality of electrodes on which voltage is applied to change the configuration of the reflecting surface, and an image taking section having the variable configuration mirror as a part of the optical system thereof, including the step of effecting control so as to apply a voltage commonly on at least two electrodes of the plurality of electrodes provided on the variable configuration mirror.

In an eighth aspect of the invention, there is provided a controlling method of imaging apparatus including a variable configuration mirror provided with a reflecting surface for changing optical path and a plurality of electrodes on which voltage is applied to change the configuration of the reflecting surface, and an image taking section having the variable configuration mirror as a part of the optical system thereof for use in focusing, including the steps of: effecting control so as to apply a voltage commonly on at least two electrodes of the plurality of electrodes at the time of focusing; and effecting control so as to apply a voltage independently on each of all of the plurality of electrodes at the time of taking image.

In a ninth aspect of the invention, there is provided an imaging apparatus including: a variable configuration mirror having a reflecting surface capable of being changed in configuration by an application of voltage; an image taking section having the reflecting surface of the variable configuration mirror as a constituent part of an optical system thereof; a voltage applying section for applying voltage on the variable configuration mirror; and a configuration retaining control section for controlling the voltage applying section so as to retain the reflecting surface of the variable configuration mirror to a certain configuration.

In the imaging apparatus according to the ninth aspect, the configuration retaining control section may be so constructed as to control the voltage applying section so that voltage is intermittently applied on the variable configuration mirror to retain the configuration of the reflecting surface of the variable configuration mirror.

In the imaging apparatus according to the ninth aspect, the configuration retaining control section may be so constructed as to control the voltage applying section so that the application time interval of the intermittent voltage application is changed in accordance with zoom variable power set at the image taking section.

In the imaging apparatus according to the ninth aspect, the configuration retaining control section may be so constructed as to control the voltage applying section so that, in the case where set zoom variable power is relatively low, the application time interval of the intermittent voltage application is longer as compared to the case where a relatively high zoom variable power is set.

In the imaging apparatus according to the ninth aspect, the configuration retaining control section may be so constructed as to control the voltage applying section so that the application time interval of the intermittent voltage application is changed in accordance with the image taking mode of the imaging apparatus.

In the imaging apparatus according to the ninth aspect, the configuration retaining control section may be so constructed as to control the voltage applying section so that the application time interval of the intermittent voltage application in a moving image taking mode is longer as compared to that in a still image taking mode.

In the imaging apparatus according to the ninth aspect, the configuration retaining control section may be so constructed as to control the voltage applying section so that, when the remaining battery amount of a battery provided in the imaging apparatus is lower than a predetermined amount, the application time interval of the intermittent voltage application is longer as compared to the case where it is higher than the predetermined amount.

In the imaging apparatus according to the ninth aspect, the configuration retaining control section may be so constructed as to effect control by making a selection in accordance with an operating condition of the imaging apparatus as to which one of an intermittent voltage application or a continuous voltage application is to be caused by the voltage applying section.

In the imaging apparatus according to the ninth aspect, the configuration retaining control section may be so constructed as to control the voltage applying section so that an intermittent voltage application is caused in the period during which the imaging apparatus displays a through (monitor) image on a display section.

In the imaging apparatus according to the ninth aspect, the configuration retaining control section may be so constructed as to control the voltage applying section so that an intermittent voltage application is caused when the imaging apparatus is taking a moving image.

In the imaging apparatus according to the ninth aspect, the configuration retaining control section may be so constructed as to control the voltage applying section so that a continuous voltage application is caused when the imaging apparatus is taking image in a high image quality mode.

In the imaging apparatus according to the ninth aspect, the configuration retaining control section may be so constructed as to control the voltage applying section so that an intermittent voltage application is caused until start of exposure after focus lock and a continuous voltage application is caused during exposure.

The imaging apparatus according to the ninth aspect may employ a construction where the variable configuration mirror is used in adjusting a focal point position of the image taking section.

In the imaging apparatus according to the ninth aspect, one having the reflecting surface capable of being changed in configuration by electrostatic force may be used as the variable configuration mirror.

In a tenth aspect of the invention, there is provided an imaging apparatus including: a variable configuration mirror having a reflecting surface capable of being changed in configuration by an application of voltage; an image taking section having the reflecting surface of the variable configuration mirror as a constituent part of an optical system thereof; a voltage applying section for applying voltage on the variable configuration mirror; and a control section for controlling the voltage applying section so as not to apply voltage on the variable configuration mirror between each image taking when the imaging apparatus is in an interval image taking condition.

In an eleventh aspect of the invention, there is provided a controlling method of imaging apparatus including a variable configuration mirror having a reflecting surface capable of being changed in configuration by an application of voltage, an image taking section having the reflecting surface of the variable configuration mirror as a constituent part of an optical system thereof, and a voltage applying section for applying voltage on the variable configuration mirror, including the step of controlling the voltage applying section so as to effect an intermittent voltage application to retain the reflecting surface of the variable configuration mirror to a certain configuration.

BRIEF DESCRIPTION OF THE DRAWINGS

FIGS. 1A and 1B are a top view and a sectional view, respectively, showing an example of the construction of a variable configuration mirror.

FIG. 2 is a block diagram showing an example of the construction of a typical drive section of the variable configuration mirror shown in FIGS. 1A and 1B.

FIGS. 7A and 7B each are a flowchart showing a subroutine operation of AF detection in the flowchart shown in FIG. 6.

FIG. 8 shows a dividing pattern of fixed electrodes in a modification of the variable configuration mirror.

DESCRIPTION OF THE PREFERRED EMBODIMENTS

Figure 3:
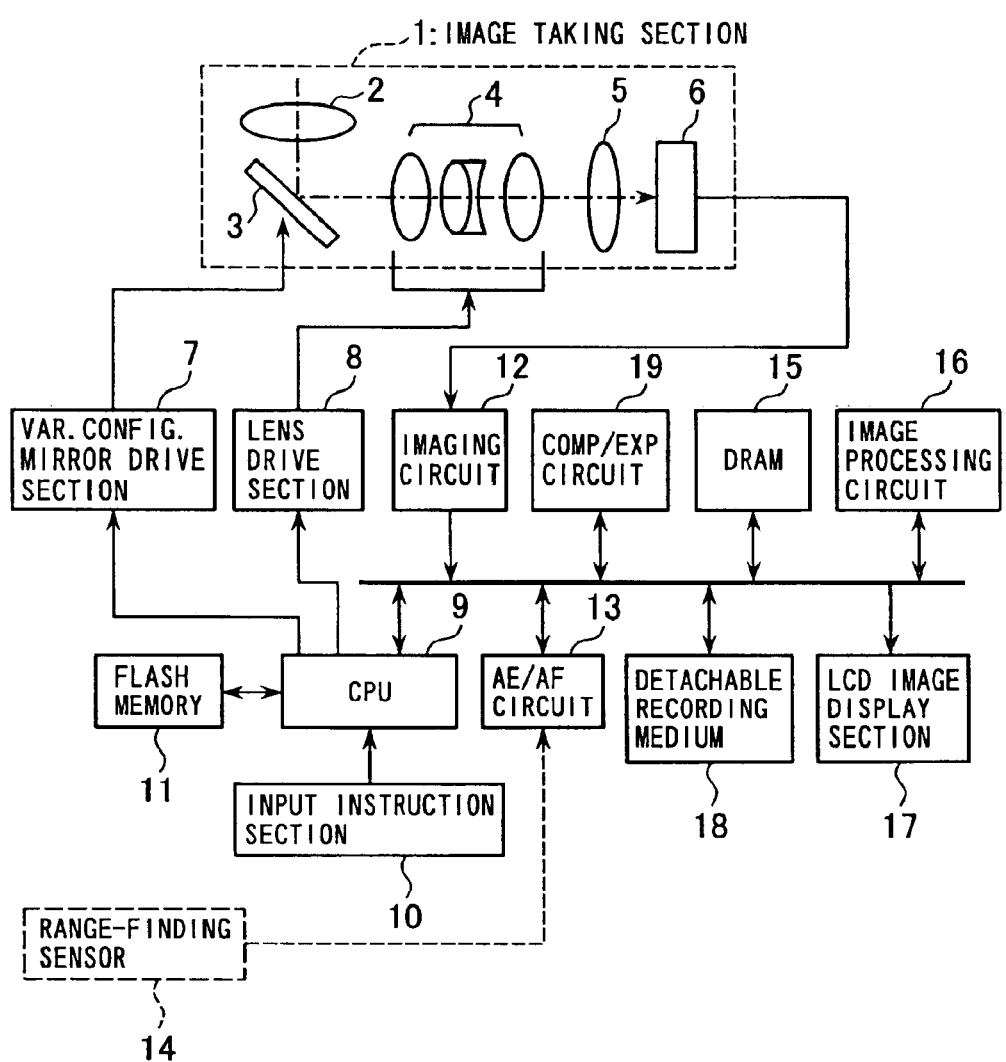
FIG. 3 is a block diagram showing construction of the digital camera of a first embodiment of the imaging apparatus according to the invention.

Some embodiments of the invention will now be described. FIG. 3 is a schematic block diagram showing an overall construction of digital camera to which a first embodiment of the imaging apparatus according to the invention is applied. Referring to FIG. 3, denoted by numeral 1 is an imaging section which includes: a first group optical system 2 for receiving an incoming object light; a variable configuration mirror (deformable mirror or flexible mirror) 3 having a similar construction as that shown in FIGS. 1A and 1B, forming a second group optical system for reflecting the light transmitted through the first group optical system 2 and for adjusting focus of optical system; a zoom optical system 4 consisting of third to fifth group optical systems receiving reflected light from the variable configuration mirror 3; a sixth group optical system 5 on which the light transmitted through the zoom optical system 4 is incident; and an imaging device 6 such as of CCD disposed in a manner facing the sixth group optical system 5. Numeral 7 denotes a variable configuration mirror drive section for driving the variable configuration mirror 3 and numeral 8 denotes a lens drive section for driving and controlling the drive motor (not shown) of the zoom optical system 4.

In FIG. 3, numeral 9 denotes CPU for controlling operation of each section of the camera, and numeral 10 denotes an input instruction section having a power ON/OFF button, taking mode button, zoom button, release button, LCD image display ON/OFF button, etc. Also included are: 11, a flash memory for storing for example camera program and a look-up table (LUT) concerning the drive control data of the variable configuration mirror; 12, an imaging circuit for generating image data by processing imaging signals from the imaging device 6; 13, AF/AE circuit for performing a contrast AF processing using image data or an AF processing based on a range finding sensor 14, and AE processing using image data; 15, DRAM for temporarily storing image data; 16, image processing circuit for subjecting the image data to various image processing; 17, LCD image display section for displaying image which is reproduced based on the image data; 18, an attachable/detach able recording medium such as Smart Media for recording image data; and 19, compression/expansion circuit for effecting compression at the time of recording image data to the recording medium 18 and for effecting expansion at the time of reading/displaying from the recording medium 18.

An example of the construction of the variable configuration mirror drive section 7 will now be described by way of FIG. 4. The construction of this example is such that, of the plurality (three in this case) of fixed electrodes of the variable configuration mirror 3, drive control can be effected by switching between the drive control based on a single electrode by voltage application only on one at the center and an all-electrode independent drive control where voltages are applied separately to all the electrodes. Here it is supposed that the variable configuration mirror 3 has three, first to third fixed electrodes 22-1, 22-2, 22-3 disposed on a base plate 21. Denoted by numeral 23 is a mirror body (movable electrode) and 24 is a spacer. The variable configuration mirror drive section 7 includes: a booster circuit 25 for increasing a battery (power supply) voltage (3.3V) to 100V; a variable configuration mirror driver 26 consisting of three, first to third drive circuits for generating application voltages to the three, first to third electrodes 22-1 to 22-3 of the variable configuration mirror 3; first switching devices 27-1, 27-2, 27-3 each of FET connected, respectively, between first to third output terminals 26-1, 26-2, 26-3 of the respective drive circuits of the driver 26 and the first to third electrodes 22-1, 22-2, 22-3; and a second switching device 28 connected in parallel to the first switching device 27-1 which is connected between the first output terminal 26-1 of the driver 26 and the first electrode 22-1.

The first switching devices 27-1 to 27-3 have their control terminals (gates) connected in common so that their ON/OFF is controlled by control voltage $V_{SW1}$ to be applied on each control terminal. Further, ON/OFF control of the second switching device 28 is effected by control voltage $V_{SW2}$ to be applied on a control terminal thereof.

Thus constructed variable configuration mirror drive section 7 is the system for switching between the all-electrode independent drive control of the variable configuration mirror and the drive control by a single electrode thereof. By bringing control voltage $V_{SW1}$ of the first switching devices to "H" by control signal from CPU 9, all of the first switching devices 27-1 to 27-3 are turned ON. The respective output voltages $V_{OUT1}$, $V_{OUT2}$, $V_{OUT3}$ set at the first to third drive circuits are thereby applied on the first to third electrodes 22-1 to 22-3, respectively, so that all electrodes are independently driven and controlled. On the other hand, by bringing control voltage $V_{SW2}$ of the second switching device to "H", the second switching device 28 alone is turned ON. The output voltage $V_{OUT1}$ set at the first drive circuit is thereby applied only on the first electrode 22-1, resulting in the drive control by a single electrode.

In the system of this example, power consumption can thus be reduced, since it is possible to turn OFF the outputs $V_{OUT2}$, $V_{OUT3}$ of the second and third drive circuits at the time of drive by a single electrode. Processing by the single-electrode drive is to be effected so as to obtain a correspondingly sufficient image forming performance while achieving a reduction in power consumption in those cases where a strict accuracy of the configuration of the variable configuration mirror is not required as a high-quality image of the entire frame is not necessary for example at the time of: focus adjustment (contrast detection AF method so-called hill climbing AF method) based on image data; a through (monitor) image displaying mode; a low zoom ratio image taking at zoom ratios of 1 through 3 in the optical system capable of zoom ratios of 1 through 6; a moving image taking; and the image taking at a set recording image quality of 2,000,000 pixels or less in the imaging device having a full pixel of 4,000,000 pixels. In other cases at the time of usual still image taking, the all-electrode independent drive control is to be effected to obtain an image of high accuracy.

In the system of switching between the single-electrode drive and the all-electrode independent drive as described above, for example if the single electrode at the center alone is driven in AF control by the variable configuration mirror and it is switched to the all-electrode drive at the time of taking image, the relation of the drive application voltage on each electrode to the object distance at each of such drives is provided as a look-up table as shown in Table 1.

at the time of the all-electrode independent drive is applied. Accordingly, if the same voltage is applied, the case of the single-electrode drive is focused at a shorter distance. For such reason, in order to obtain the same amount of configuration change at the center portion as that at the time of AF, the application voltage on the center, first electrode is set somewhat higher than that at the time of AF when switching is to be made as described above from AF control (single-electrode drive) to the image taking condition (all-electrode independent drive).

Generally, in order to secure focusing margin, it is necessary in AF to cause the system to be temporarily focused at a distance around 2 steps shorter than the shortest distance of image taking (near position: 200 mm at step 11 in the example of Table 1). In the system to be switched between the single-electrode drive and the all-electrode independent drive as the above, even when the voltage to be applied on the center electrode at the time of image taking of the shortest distance of 200 mm is 100V, i.e., the maximum supply voltage, it is possible in AF operation to cause the system to be focused at the distance around 2 steps shorter than that (step 13) at 99V which is less than 100V.

TABLE 1

| step No | Distance to object (mm) | Single-electrode drive (partial voltage appln.) 1st electrode | All-electrode independent drive 1st electrode | All-electrode independent drive 2nd electrode | All-electrode independent drive 3rd electrode | All-electrode common voltage appln. drive 1st to 3rd electrodes |
|---|---|---|---|---|---|---|
| 1 |  | 0 | 0 | 0 | 0 | 0 |
| 2 | ∞ | 29 | 32 | 26 | 17 | 31 |
| 3 | 1000 | 41 | 45 | 37 | 25 | 43 |
| 4 | 670 | 50 | 55 | 45 | 30 | 52 |
| 5 | 500 | 57 | 63 | 51 | 34 | 60 |
| 6 | 400 | 64 | 71 | 58 | 38 | 67 |
| 7 | 330 | 69 | 77 | 62 | 41 | 73 |
| 8 | 290 | 76 | 84 | 68 | 46 | 80 |
| 9 | 250 | 80 | 89 | 72 | 48 | 85 |
| 10 | 220 | 86 | 95 | 77 | 52 | 90 |
| 11 | 200 | 90 | 100 | 81 | 54 | 95 |
| 12 |  | 95 | 105 | 86 | 57 | 100 |
| 13 |  | 99 | 110 | 89 | 59 | 105 |

The configuration of the variable configuration mirror in AF operation is changed sequentially from step 1 so as to gradually change the object distance from infinity toward near point. If, for example, the object distance of 500 mm at the application voltage of 57V on the center, first electrode is determined as a focus position in detecting focus position where contrast is at peak (hereinafter "focus position" means the configuration of the variable configuration mirror by which image is brought into focus), the voltage application is immediately switched to the corresponding all-electrode independent drive to take image. As shown in Table 1, the application voltages on the first to third electrodes at such image taking are 63V, 51V, 34V, respectively.

Since, in AF operation, it suffices to bring only a center portion of image into focus, voltage is applied only on the center, first electrode of the variable configuration mirror. When voltage is applied only on the center electrode, the degree of configuration change at the center portion of the mirror body (movable electrode) is large even though the amount of configuration change at the peripheral portion thereof is small. In this case, therefore, the amount of configuration change at the center portion is larger and the curvature thereof becomes abrupt as compared to the all-electrode independent voltage application even if the same voltage as the voltage to be applied on the center electrode Accordingly, this switching system between the single-electrode drive and the all-electrode independent drive has the following advantage in addition to achieving a reduction in power consumption. In particular, since the radius of curvature of the variable configuration mirror in the single-electrode drive only of the center electrode becomes smaller by the same drive voltage as compared to the case of all-electrode independent drive, the maximum voltage for obtaining the shortest focused distance can be reduced.

Another example of the construction of the variable configuration mirror drive section 7 will now be described by way of FIG. 5. The construction of this example is such that switching can be made between an all-electrode independent drive control where voltages are applied to all of the plurality (three in this case) of fixed electrodes of the variable configuration mirror respectively from separate driver circuits and the drive control common to all the electrodes where a common voltage is applied to all the electrodes from a single drive circuit.

Figure 4:
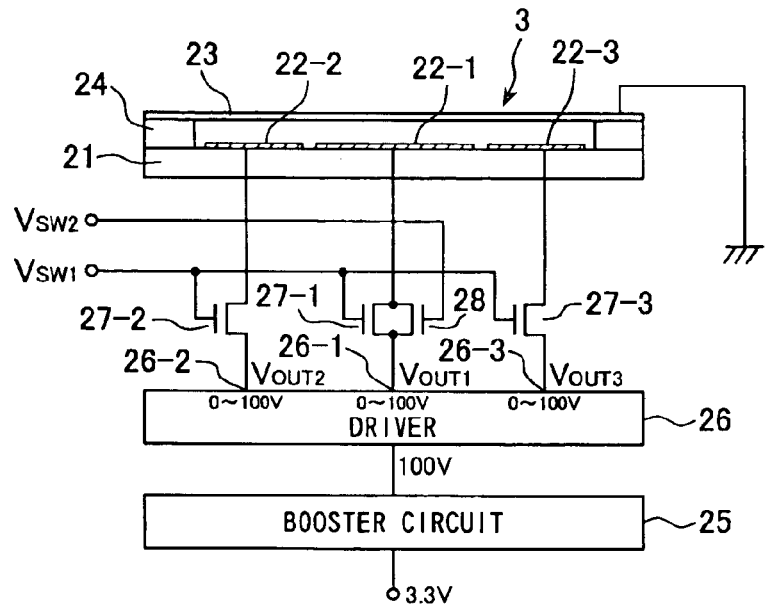
FIG. 4 is a schematic block diagram showing an example of the variable configuration mirror drive section of the first embodiment shown in FIG. 3.
Figure 5:
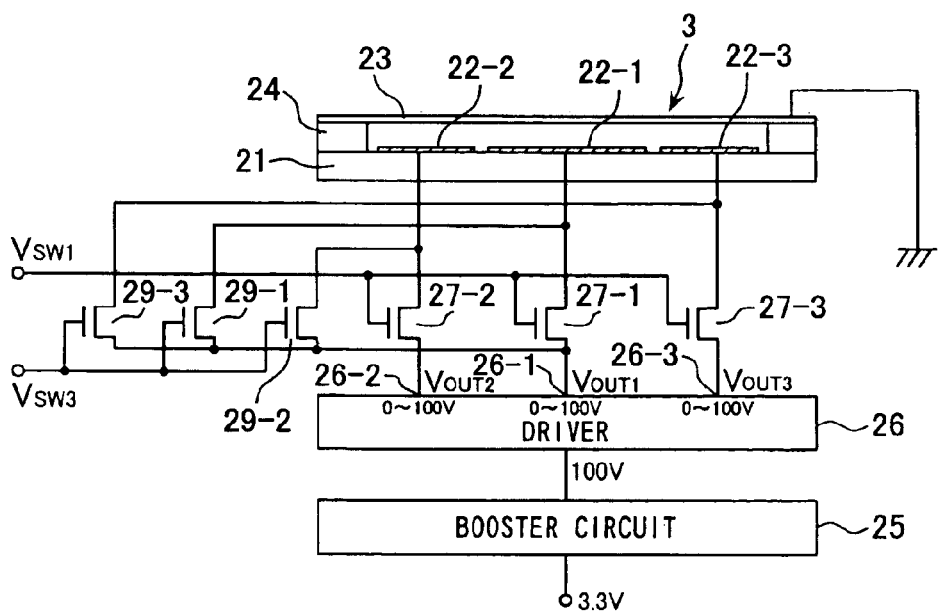
FIG. 5 is a schematic block diagram showing another example of the variable configuration mirror drive section of the first embodiment shown in FIG. 3.

In particular as shown in FIG. 5, this drive section, similarly to the drive section shown in FIG. 4, includes: a booster circuit 25; a driver 26 consisting of three, first to third drive circuits; and first switching devices 27-1 to 27-3 connected between first to third output terminals 26-1 to 26-3 of the respective drive circuits of the driver 26 and the first to third electrodes 22-1 to 22-3 of the variable configuration mirror 3. It further includes third switching devices 29-1 to 29-3 each of FET, connected in common at one end thereof to the first output terminal 26-1 of the first drive circuit among the drive circuits and connected at the other end thereof respectively to the first to third electrodes 22-1 to 22-3 of the variable configuration mirror.

The first switching devices 27-1 to 27-3 have their control terminals connected in common so that their ON/OFF is controlled by control voltage $V_{SW1}$ to be applied on each control terminal. Further, the third switching devices 29-1 to 29-3 have their control terminals connected in common so that their ON/OFF is controlled by control voltage $V_{SW3}$ to be applied on each control terminal.

Thus constructed variable configuration mirror drive section 7 is the system for switching between all-electrode independent drive control of the variable configuration mirror and all-electrode common drive control thereof by a single driver circuit. In particular, by bringing control voltage $V_{SW1}$ of the first switching devices to "H" by control signal from CPU 9, all of the first switching devices 27-1 to 27-2 are turned ON. The respective output voltages $V_{OUT1}$, $V_{OUT2}$, $V_{OUT3}$ set at the first to third drive circuits are thereby applied respectively on the first to third electrodes 22-1 to 22-3 so that all-electrode independent drive control is effected. On the other hand, by bringing control voltage $V_{SW3}$ of the third switching devices to "H", all of the third switching devices 29-1, 29-2, 29-3 are turned ON. The output voltage $V_{OUT1}$ set at the first drive circuit is thereby applied commonly on the first to third electrodes 22-1 to 22-3, resulting in the all-electrode common drive control.

In the system of this example, thus, power consumption can be similarly reduced at the time of all-electrode common drive control by the single drive circuit, since it is possible to turn OFF the outputs $V_{OUT2}$, $V_{OUT3}$ of the second and third drive circuits.

Among actual examples of application where the all-electrode common drive control of this method is effected, similarly to the case of the single-electrode drive control, in addition to AF, there are: the case where a magnification power of 1 through 3 is set as zoom ratio in one having magnification powers of 1 through 6 as the total zoom ratio range of the imaging section; the cases of a through (monitor) image displaying mode and moving image taking mode set as the image taking mode; and the case where a set recording image quality of 2,000,000 pixels or less is set in one having a full pixel of the imaging apparatus of 4,000,000 pixels regarding the recording image quality.

In this system, a look-up table as shown in Table 1 is similarly provided as the relation of the drive application voltage on each electrode of the variable configuration mirror with respect to the object distance when switching is to be made between the all-electrode independent drive and the all-electrode common drive.

Figure 6:
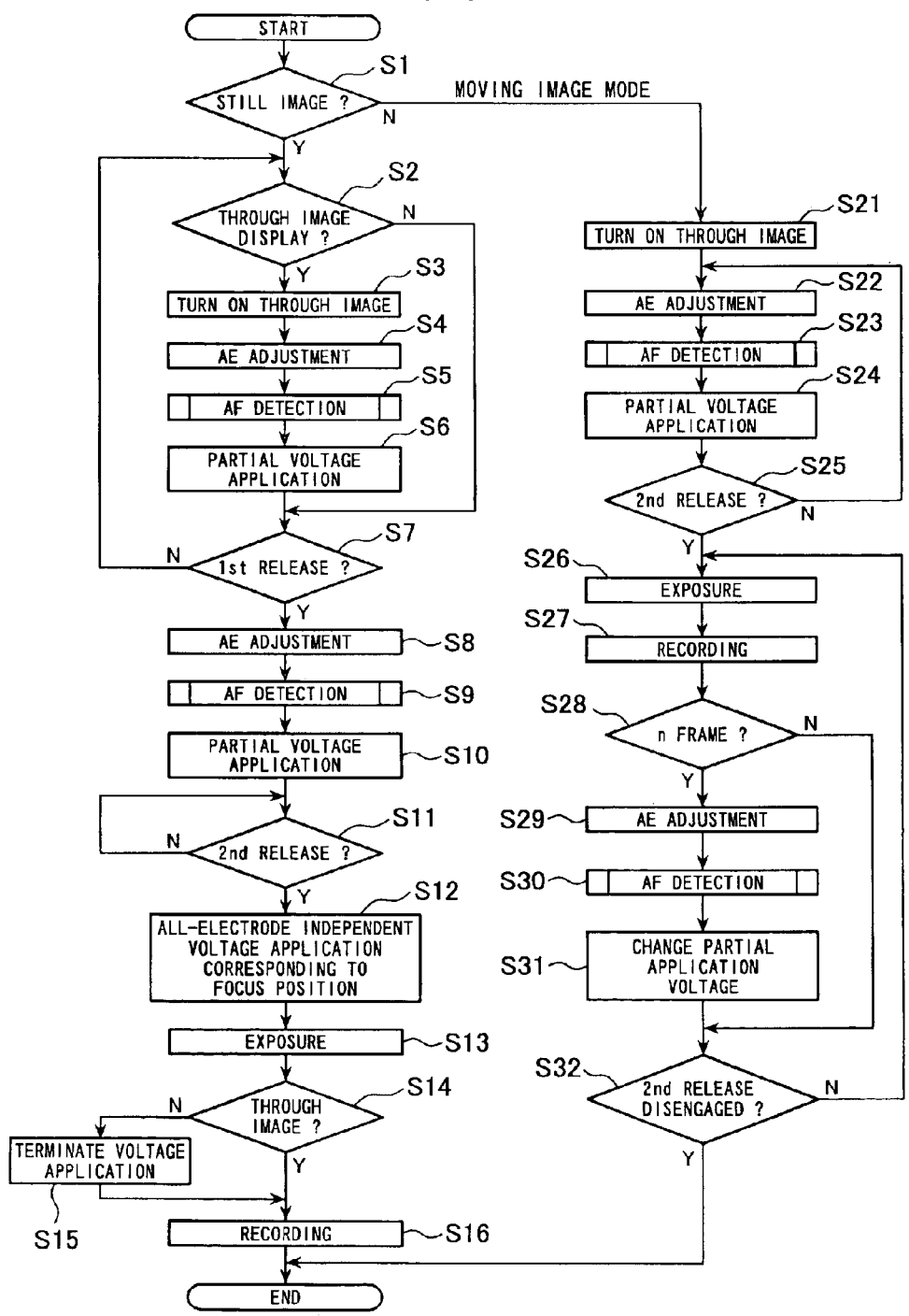
FIG. 6 is a flowchart for explaining operation of the first embodiment shown in FIG. 3.

A description will now be given by way of the flowchart of FIG. 6 with respect to operation of main portions to be mainly controlled by CPU, of the digital camera according to the embodiment shown in FIG. 3. It is supposed here that one having the construction shown in FIG. 4, i.e., the system of switching between the single-electrode drive and the all-electrode independent drive is used as the drive section of the variable configuration mirror 3. First, determination is made as to which one of a still image taking mode or a moving image taking mode is set as the image taking mode (step S1). When the still image taking mode has been set, it is then determined whether a through image is to be displayed or an optical finder be used (step S2). If a through (monitor) image is to be displayed, a through image display by LCD image display section 17 is turned ON (step S3).

Since an adjustment of brightness and focal point adjustment are naturally required in the displaying of a through (monitor) image, AE adjusting operation (step S4) and subroutine operation of AF detection (step S5) for the object are effected. The AF detection can be a range-finding AF method and a hill climbing AF method (contrast detection AF method). If the range-finding AF method is used, the distance is determined as shown in FIG. 7A by the range finding sensor 14 (step S5-11) to detect focus position of the variable configuration mirror 3 to be used in adjusting focal point with respect to the object (step S5-12). If, on the other hand, the hill climbing AF method (contrast detection AF method) is used, the single-electrode drive is effected as shown in FIG. 7B on the single, center electrode of the focus adjusting variable configuration mirror 3 to apply an initial-value voltage (voltage corresponding to infinity margin or near point margin) (step S5-21), to take image (step S5-22), to detect a contrast value (step S5-23), and to determine whether or not the contrast value is at its peak (step S5-24).

Here, if the contrast value has not reached its peak (naturally, no peak value exists at the first image taking step), the application voltage value on the variable configuration mirror 3 is changed to change its configuration (step S5-25). An image is taken again and determination is repeated as to whether or not a peak value exists in those previously obtained contrast values. If it is determined as that a peak value exists in the obtained contrast values, the configuration of the variable configuration mirror 3 corresponding to the object distance at which such a peaking contrast value is obtained is detected as the focus position (step S5-26).

When AF detection has been effected in this manner, the program returns to the main routine where the voltage corresponding to the detected focus position is continuously applied on the single, center electrode of the variable configuration mirror 3 (partial voltage application: step S6) to continue the displaying of a through (monitor) image. It is then determined whether 1st release manipulation has been effected or not (step S7). If 1st release manipulation has not been effected, the operations of and after the through image display determining operation at step S2 are repeated and the program waits for the effecting of 1st release manipulation. Further, if the displaying of through image is not being effected, the program jumps the operation of steps S3 to S6 and proceeds to step S7 for determining 1st release manipulation, since such as AE adjustment, AF detection, voltage application on the variable configuration mirror for the displaying of through image are not necessary.

When 1st release manipulation has been effected, AE adjusting operation (step S8), AF detecting operation (step S9), and the partial voltage application operation to the center electrode of the variable configuration mirror 3 corresponding to the focus position (step S10) are effected again as readjustment of taking condition for AE, AF lock operation and the program waits for 2nd release manipulation (step S11).

When 2nd release manipulation has been effected, LUT is looked up so that the independent drive voltages onto all the electrodes of the variable configuration mirror 3 corresponding to the focus position obtained by AF detecting operation at the preceding step S9 are respectively applied on each electrode from the variable configuration mirror drive section 7 (step S12). The variable configuration mirror 3 is thereby brought to a configuration by which a high-quality taken image can be obtained, and then an image is taken with an exposure (step S13). After the exposure image taking, it is determined whether the system is in the through (monitor) image displaying mode or not (step S14). If not in the through image displaying mode, the voltage application on the variable configuration mirror 3 is terminated to save power (step S15). If it is in the through image displaying mode, the variable configuration mirror is brought back to the previous partial voltage application mode so that, while continuing the displaying of a through image, the recording of taken image is effected (step S16).

As the above, in the case of still image taking mode, the all-electrode independent drive or the single-electrode drive (partial voltage application) can be properly used to obtain a high-quality still image while achieving a reduction in power consumption. If the system is in a moving image taking mode, on the other hand, it operates as follows. It should be noted that an explanation is given below on the supposition that a through (monitor) image is automatically displayed on LCD image display section 17, since a finder is hardly used at the time of a moving image taking mode. If it is determined as in the moving image taking mode at the above described step S1, the function for displaying a through image on the LCD image display section 17 is automatically turned ON (step S21). Subsequently, similarly to each operation of steps S4 to S6 for displaying a through image in the case of still image taking mode, AE adjusting operation (step S22), AF detecting operation (step S23), and the partial voltage applying operation onto a single electrode of the variable configuration mirror 3 corresponding to focus position obtained by the AF detecting operation (step S24) are effected to display a through image on the LCD image display section 17.

In the moving image taking mode, since AE, AF lock operation by 1st release manipulation is considered to be unnecessary, such processing is omitted and the program here immediately enters 2nd release operation. It is thus determined whether or not 2nd release manipulation has been rendered during the displaying of through (monitor) image (step S25). If 2nd release operation has not been effected, the operation for displaying through image is repeated from the AE adjustment at step S22 and the program waits for the rendering of 2nd release manipulation. When 2nd release manipulation has been effected, an exposure image taking is started (step S26) and the consecutive recording of taken images is effected (step S27).

In the case of moving image taking, since the scene of the image taking is changed for example due to the object's movement, the image taking without changing the AE, AF condition immediately before the exposure image taking is not to be continued, and readjustment of AE, AF is usually effected at every several frames, for example at every five frames. It is thus determined whether or not the taking/recording of "n" frames has been effected after the taking/recording of the first frame (step S28). If the taking/recording of "n" frames has been completed, AE adjustment (step S29), AF detection (step S30) are effected again, and the voltage value of voltage applied on a single electrode of the variable configuration mirror is changed in accordance with the change in focus position obtained by the AF operation (step S31). It is then determined whether 2nd release manipulation has been terminated or not, i.e., whether or not 2nd release has been disengaged (step S32). If 2nd release has not been disengaged, the program returns to step S26 to continue the exposure recording. When 2nd release has been disengaged, the exposure recording operation of moving image taking mode is terminated.

It should be noted that, in the case where the taking/recording of "n" frames has not been completed at step S28 for determining whether or not the taking/recording of "n" frames has been effected, readjustment of AE, AF conditions is not effected and the exposure/recording is continued until the disengagement of 2nd release. In this manner, the case of moving image taking mode uses only the partial voltage application on a single electrode for the variable configuration mirror to take moving images while achieving a reduction in power consumption.

In this explanation of the operation, an example has been described of the construction where the drive section of the variable configuration mirror is switched between the single-electrode drive and the all-electrode independent drive as shown in FIG. 4. However, also in the case of using the variable configuration mirror drive section of the construction where switching is made between the all-electrode common voltage application drive and the all-electrode independent drive as shown in FIG. 5, it possible to cause similar operation and to obtain similar effect and advantage by replacing the single-electrode drive operation step (partial voltage application) with the all-electrode common voltage application drive operation step.

The above described embodiment has been shown as that in which three units of fixed electrode of the variable configuration mirror are provided so that a two-stage switching control of the single-electrode drive or all-electrode common voltage application drive and the all-electrode independent drive is effected by the variable configuration mirror drive section to achieve a reduction in power consumption. The constructions as in the following are regarded as its modification. In particular, those feasible include the manner of drive where the number of electrodes among a plurality of electrodes of the variable configuration mirror on which voltage is applied is reduced by a step-by-step switching or where the number of electrode groups on which voltage is commonly applied is changed step by step.

For example, for the variable configuration mirror where eight fixed electrodes having a partition pattern as shown in FIG. 8 are disposed so as to achieve 6-partition electrode construction symmetrical with respect to an axis by always connecting in common those electrodes of the same number (④ and ④, ⑤ and ⑤), the drive method of the following manner is feasible. It should be noted that the variable configuration mirror of the above described 6-partition electrode construction is to be used for an adjustment of focus of a three times zoom optical system.

In particular, drive modes according to zoom ratio are: drive by applying voltages independently from six drive circuits to each of the electrodes ① to ⑥ at the time of telephoto condition where the accuracy of the configuration is strict; and drive at the time of wide-angle condition where three partitioned electrode groups are formed by combining ① and ②, ③ and ④, ⑤ and ⑥, respectively, so as to apply voltages from three drive circuits to the partitioned electrode groups commonly to the electrodes in each group. In this case, three of the six drive circuits can be turned OFF.

Further, as the drive mode for each image taking mode, drive mode for causing drive by applying voltages independently from six driver circuits to each of the electrodes ① to ⑥ is used at first in the case of a still image taking mode. At the time of a moving image taking mode or through image displaying mode, on the other hand, 2-partitioned construction consisting of a combination of ① and ② and a combination of ③ to ⑥ is formed and drive mode for causing drive by applying voltage respectively from two drive circuits commonly to each partitioned electrode group is used.

As the drive mode for the operation in taking image, it is possible to achieve a reduction in power saving at the time of AF detection by using 2-partitioned construction consisting of a combination of ① and ② and a combination of ③ to ⑥ so that drive is caused by applying voltages from two drive circuits to the respective partitioned electrode groups or drive is caused by applying voltage commonly to all the electrodes ① to ⑥ from one drive circuit.

Further, the examples of construction of the drive section of the variable configuration mirror shown in FIGS. 4 and 5 have been shown as those in which changeover switching devices are disposed at the output terminal of each drive circuit of the driver so that switching is made based on ON/OFF control thereof between the single-electrode drive or all-electrode common voltage application drive and the all-electrode independent drive. It is however also possible to control ON/OFF of the operation of each drive circuit itself of the driver so as to control the voltage application on each electrode of the variable configuration mirror. Since the power consumption attributed to the drive circuit accounts for a large portion of the power consumption of the variable configuration mirror including the driver, a further power saving can be achieved by effecting such ON/OFF control of the drive circuit itself.

Figure 9:
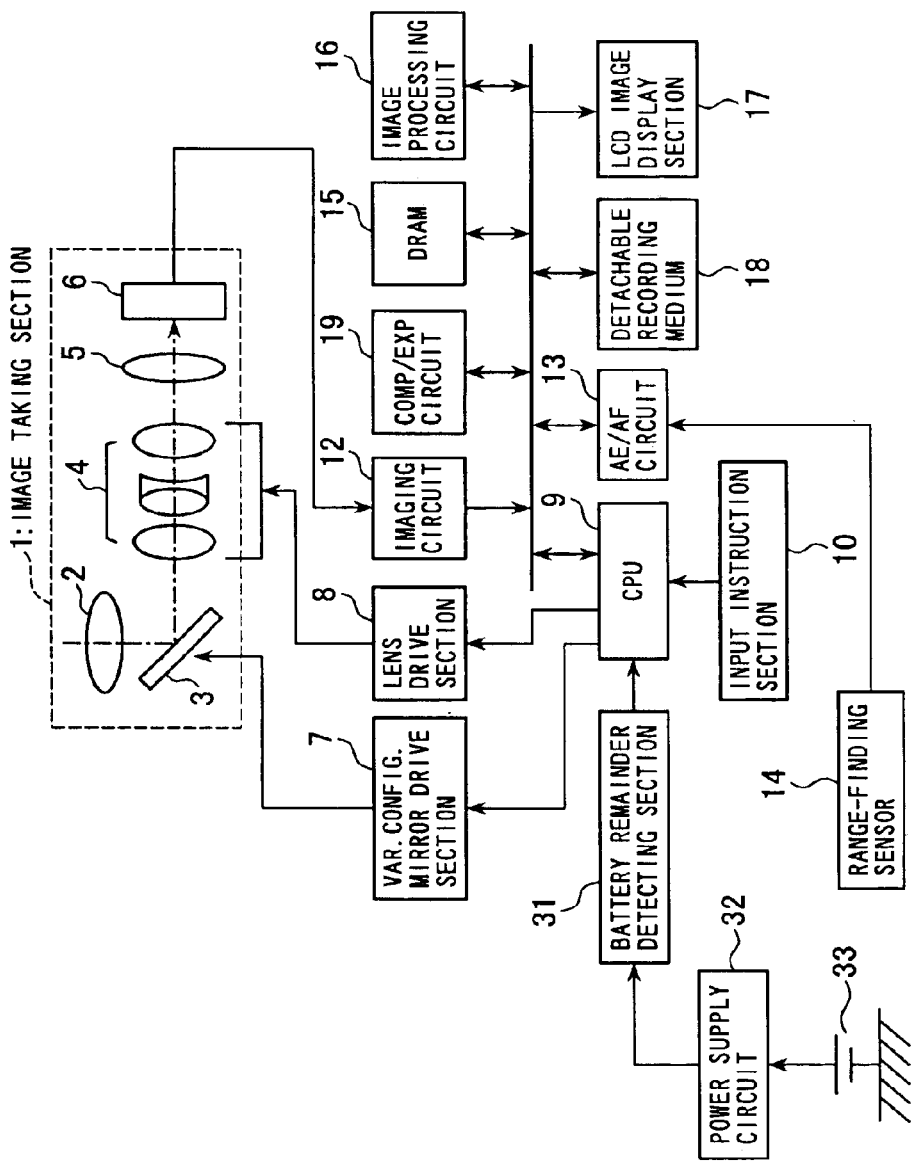
FIG. 9 is a block diagram showing construction of the digital camera of a second embodiment of the imaging apparatus according to the invention.

A second embodiment of the invention will now be described. FIG. 9 is a schematic block diagram showing an overall construction of the digital camera to which the second embodiment is applied. Like components as in the digital camera according to the first embodiment shown in FIG. 3 are denoted by like reference numerals and description thereof will be omitted. This embodiment is provided with a battery remaining amount detecting section 31 for detecting the remaining amount of the battery in addition to the components in the digital camera according to the first embodiment shown in FIG. 3 and also includes in illustration a power supply circuit 32 having for example a booster circuit and protection circuit and a battery 33 which are not illustrated in the first embodiment shown in FIG. 3. Further, the input instruction section 10 includes such as an image quality changeover button in addition to a power ON/OFF button, mode button, zoom button, release button, and LCD image display ON/OFF button.

Figure 10:
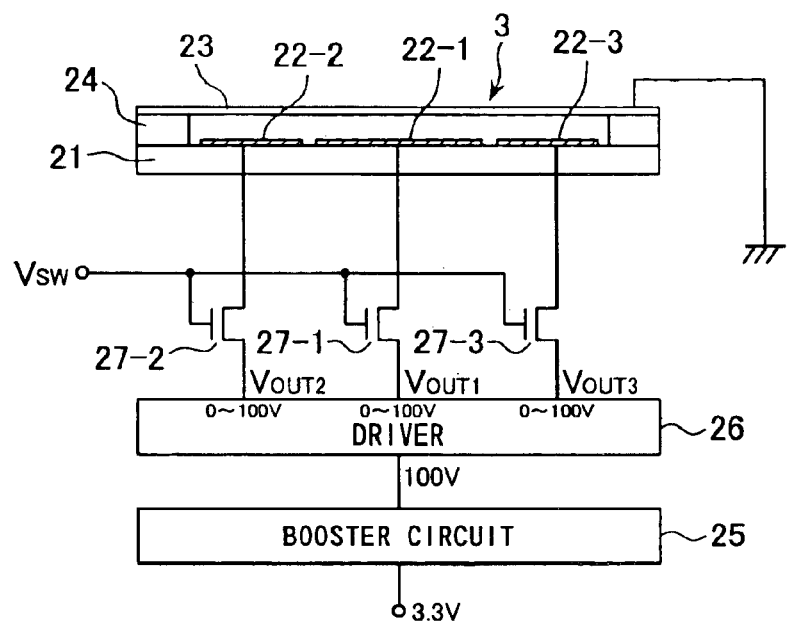
FIG. 10 is a schematic diagram showing an example of construction of the variable configuration mirror drive section of the second embodiment shown in FIG. 9.

The construction of the variable configuration mirror drive section 7 in this embodiment will be described with respect to the case of using an identical construction as the conventional example shown in FIG. 2, which is illustrated again in FIG. 10 and will be described below. Referring to FIG. 10: numeral 25 denotes a booster circuit for increasing the voltage (for example 3.3V) of the battery 33 to a maximum application voltage (for example 100V) onto the fixed electrodes of the variable configuration mirror 3; and numeral 26 denotes a driver for setting application voltages to each fixed electrode (22-1, 22-2, 22-3) of the variable configuration mirror 3, which in this example is constituted by three drive circuits so as to be able to drive the variable configuration mirror 3 having three fixed electrodes 22-1, 22-2, 22-3. Numerals 27-1, 27-2, 27-3 respectively denote switching devices each formed of FET, connected at one end thereof to the output side $V_{OUT1}$ to $V_{OUT3}$ of each drive circuit and at the other end thereof to each fixed electrode 22-1, 22-2, 22-3 of the variable configuration mirror 3. It should be noted that the booster circuit 25 becomes unnecessary when a booster circuit in the power supply circuit 32 is used.

In thus constructed variable configuration mirror drive section 7, ON/OFF of each switching device 27-1, 27-2, 27-3 is controlled by control voltage $V_{SW}$ commonly applied on the control terminals of the respective switching devices 27-1, 27-2, 27-3 and, when turned ON, voltages $V_{OUT1}$ to $V_{OUT3}$ set at each drive circuit are applied on the respective fixed electrodes 22-1, 22-2, 22-3 so that the movable electrode (mirror body) 23 can be variably controlled to a predetermined curved configuration.

Now, when voltage is applied on the fixed electrodes in the electrostatic type variable configuration mirror having the construction shown in FIGS. 1A and 1B which is used in this embodiment, a charge of opposite polarity is caused to occur on the movable electrode side by electrostatic induction so that the fixed electrodes and the movable electrode are attracted to each other by the electrostatic force thereof. Even when the voltage application on the fixed electrode side is interrupted, charges are retained for a while on the fixed electrodes and movable electrode and the movable electrode does not immediately return to its configuration before the voltage application (flat shape). The retained charges however are leaked with the passage of time and the amount of configuration change of the movable electrode is reduced and becomes smaller. By applying voltage again while the reduction in the configuration change amount of the movable electrode is still small enough, therefore, a substantially predetermined amount of configuration change can be retained. In this manner, if it is not necessary to strictly retain the changed configuration, a substantially predetermined changed configuration can be retained by an intermittent voltage application while reducing power consumption as compared to a continuous voltage application.

Figure 11:
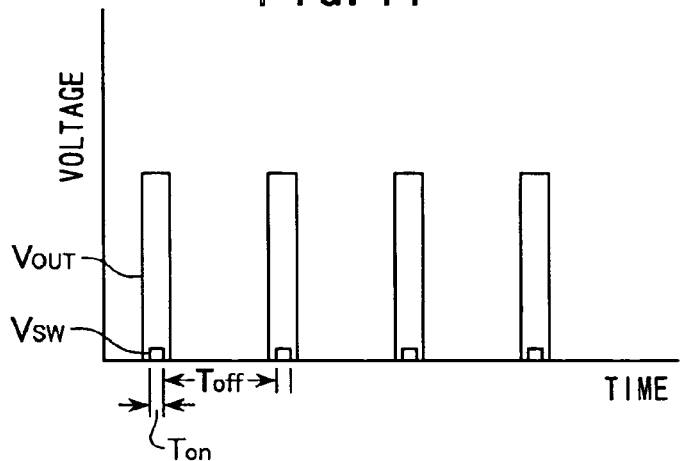
FIG. 11 shows a manner of intermittently applying voltage on the fixed electrodes of the variable configuration mirror at the variable configuration mirror drive section shown in FIG. 10.

If such intermittent voltage application is to be effected, an output $V_{OUT}$ from each drive circuit is intermittently outputted in the manner of pulse as shown in FIG. 11, and, in such output period, each switching device 27-1 to 27-3 is turned ON by control voltage $V_{SW}$ (of the order of 1V) so as to apply the output $V_{OUT}$ of each drive circuit on the respective fixed electrodes 22-1 to 22-3 of the variable configuration mirror 3. It should be noted that, in FIG. 11, Ton refers to ON period (of the order of 10 msec) of the switching device, which is the voltage application period on the electrodes of the variable configuration mirror, and Toff refers to OFF period of the switching device, which is a suspension period of voltage application on the electrodes of the variable configuration mirror.

Here the reason for causing ON/OFF operation of the switching device in the period during which output $V_{OUT}$ of each drive circuit is being outputted is as follows. In particular, if it is attempted to concurrently effect ON/OFF of the output of each drive circuit and ON/OFF of the switching device, there is a possibility of the case where the output of the drive circuit is turned OFF before the turning OFF of the switching device because of a small shift thereof. In such a case, since the output of the drive circuit is turned OFF in the condition where the switching device is ON, the charge retained at the variable configuration mirror based on the intermittent voltage application is discharged and it becomes impossible to retain the predetermined configuration. In order to securely stop an occurrence of such phenomenon, ON/OFF operation of the switching device is effected at timings as described above.

Figure 12:
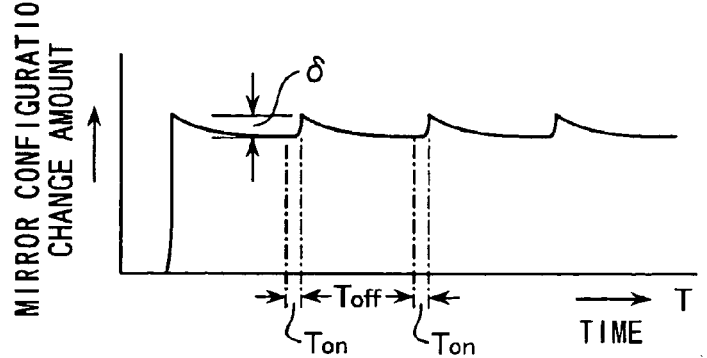
FIG. 12 shows the manner of change in mirror configuration of the variable configuration mirror when voltage is intermittently applied on the variable configuration mirror.

Shown in FIG. 12 are the configuration change amount and the manner of decrease in configuration change of the movable electrode (mirror body) of a variable configuration mirror in the case where such intermittent voltage application is effected. There is practically no problem if the configuration change decrease amount δ is made smaller to such an extent not affecting the actual image taking. The value of allowable configuration change decrease amount δ here, however, varies from one image taking mode to another. It is thus possible to achieve an efficient use of battery, i.e., power saving by setting a voltage application suspension period (intermittent voltage application interval) Toff of the intermittent voltage application correspondingly to each mode.

Figure 13:
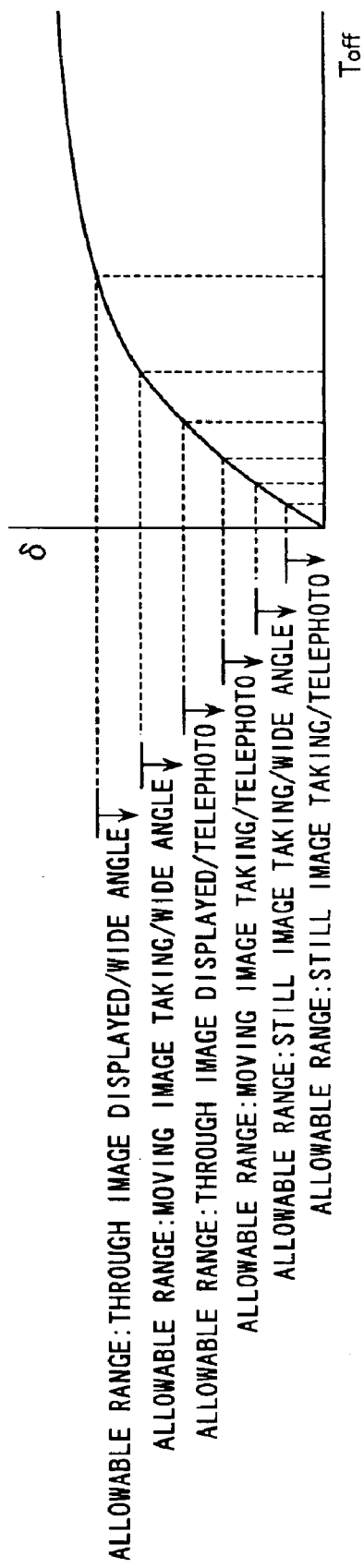
FIG. 13 shows the relationship between intermittent voltage application interval Toff and decreased amount δ in the change of mirror configuration when voltage is intermittently applied on the variable configuration mirror.

FIG. 13 shows the relation between the voltage application suspension period (intermittent voltage application interval) Toff and the configuration change decrease amount δ. It also indicates an allowable range of the configuration change decrease amount δ for (telephoto and wide-angle) still images, an allowable range for (telephoto and wide-angle) moving images, and an allowable range for the displaying of through image (LCD image display: telephoto and wide-angle).

Further, shown in Table 2 is an example of the manner of selecting a continuous voltage application or an intermittent voltage application in each operation mode and actual time (sec) of Toff according to zoom variable magnifications when the intermittent voltage application is selected. The content shown in Table 2 can be stored to CPU 9 in the form of a look-up table. It should be noted that it is also possible to store the look-up table to a flash memory in a similar manner as the first embodiment shown in FIG. 3.

TABLE 2

|  |  | Zoom variable power Z | |
| --- | --- | --- | --- |
|  |  | Wide-angle ($1 \leq Z < 3$) | Telephoto ($3 \leq Z \leq 6$) |
| Through image display mode | Battery amount: large | 2 sec | 1 sec |
|  | Battery amount: small | 3 | 2 |
| Mode after 1st release (AE/AF locked) |  | 2 | 1 |
| During taking still image mode (single/consecutive taking) | Low image quality | 0.5 | 0.2 |
|  | High image quality | continuous voltage appln. | continuous voltage appln. |
| During moving image taking mode |  | 1.5 | 0.7 |

Figure 14:
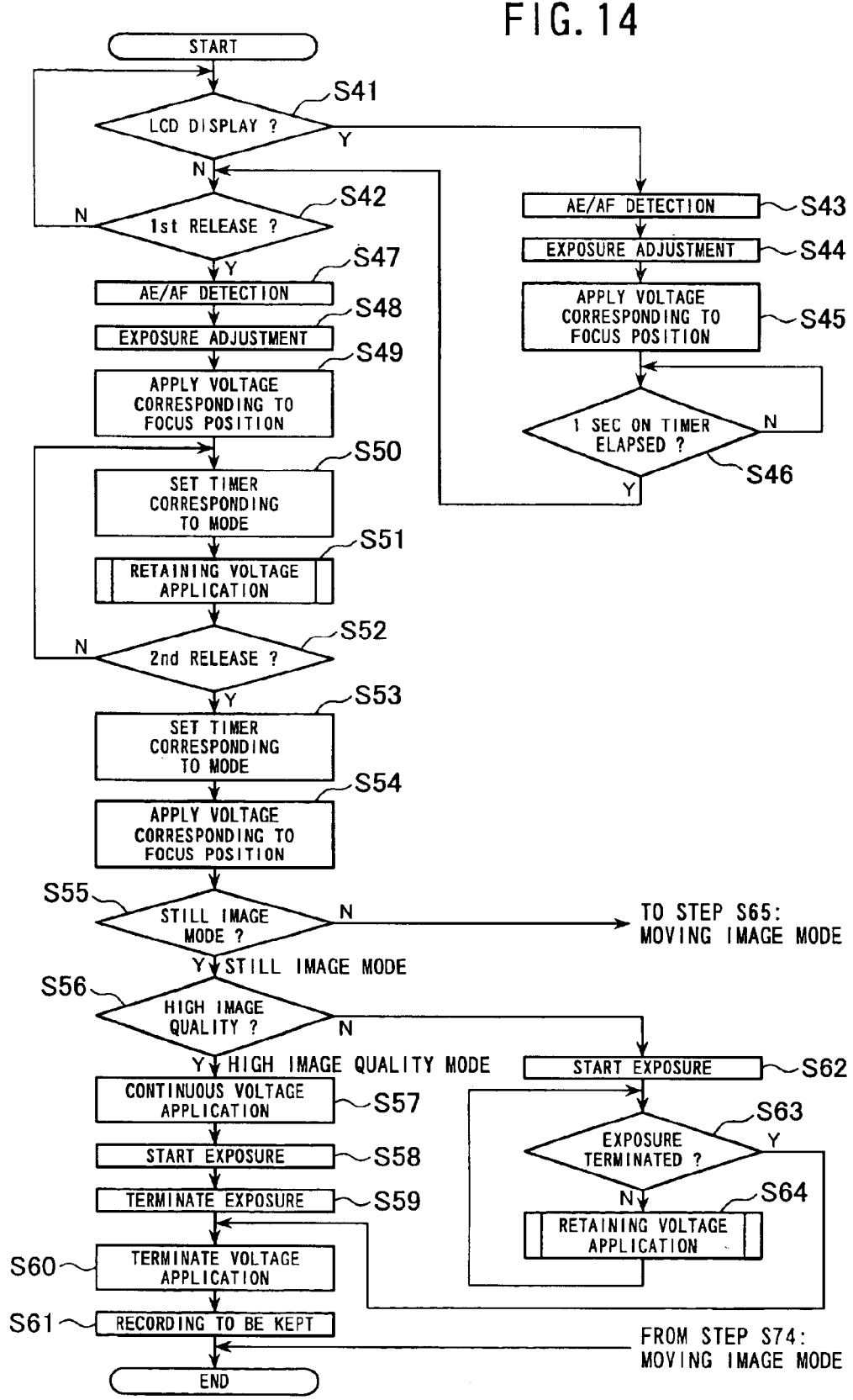
FIG. 14 shows a portion of flowchart for explaining operation of the second embodiment shown in FIG. 9.

The operation of a main portion of the digital camera according to the second embodiment shown in FIG. 9 will now be described by way of the flowcharts shown in FIGS. 14 to 16. Since the operation varies depending on the presence of LCD image displaying, it is first determined whether LCD image displaying is to be performed or not (step S41). In the case of not effecting LCD image displaying, since the object is to be observed through an optical finder, the program immediately enters the step for determining whether or not 1st release manipulation has been effected (step S42) without effecting AE/AF detection. If 1st release manipulation has not been effected, the system waits until the rendering of 1st release operation.

If on the other hand LCD image displaying is to be effected: AE detection based on image data and AF detection based on distance data by the range finding sensor 14 are effected (step S43); exposure adjustment based on the AE detection is effected (step S44); and voltage corresponding to focus position based on the AF detection is applied on the variable configuration mirror (step S45). Next, since, in this case, AE/AF detecting operation is repeated at intervals of 1 second, it is determined whether 1 second has elapsed on the timer or not (step S46). If 1 second has elapsed, the program then proceeds to step S42 for determining whether 1st release manipulation has been effected or not. If 1st release manipulation has not been effected, the operations of and after AE/AF detection, i.e., steps S43 to S46 are repeated.

When 1st release operation has been effected: AE/AF detection is first effected similarly to the operation shown in steps S43 to S45 to lock AE/AF (step S47); an adjustment of exposure is effected (step S48); and voltage corresponding to focus position is applied on the variable configuration mirror (step S49). Since 2nd release manipulation might not be effected immediately after 1st release manipulation, a timer setting (setting of the intermittent voltage application interval Toff) corresponding to the mode is effected (step S50), and the program proceeds to a subroutine step where voltage application for retaining the configuration is effected in accordance with the set timer interval (step S51).

Here, at the timer setting step corresponding to the mode, a timer interval (intermittent voltage application interval Toff) in the column of "Mode after 1st release (AE/AF locked)" shown in Table 2 is set. In particular, for a zoom variable power range of 1 through 6, a timer interval (Toff) of 2 seconds in the case of zoom variable power of $1 \leq Z < 3$ or of 1 second in the case of $3 \leq Z \leq 6$ is set.

Figure 16:
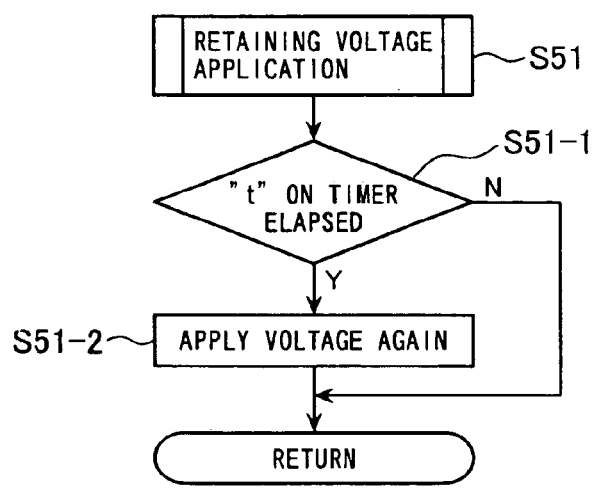
FIG. 16 is a flowchart showing subroutine steps of retaining voltage application in the flowchart shown in FIG. 14.

In the subroutine step operation of voltage application for retaining the configuration, it is first determined as shown in the flowchart of FIG. 16 whether a set timer interval t has elapsed or not (step S51-1). It should be noted that the elapsed time in this subroutine step operation is the time elapsed after the starting of the suspension period following the most recent voltage application. If set time t has elapsed, voltage application is effected again (step S51-2), and the program returns to the main routine to effect the next determination on 2nd release manipulation (step S52). If 2nd release manipulation has not been effected, the program returns to step S50 to wait until the rendering of 2nd release manipulation while effecting the intermittent voltage application by the operation of similar steps. If, on the other hand, timer time interval t has not elapsed at the above described step S51-1 for determining an elapse of the timer interval t, the program immediately proceeds to step S52 for determining 2nd release manipulation in the main routine.

When 2nd release manipulation has been rendered: timer setting corresponding to the mode is effected again (step S53); voltage application on the variable configuration mirror corresponding to focus position is effected again to set an accurate focus position (step S54); and determination is then made as to whether it is a still image mode or a moving image mode (step S55). In the case of still image mode, determination is further made as to whether it is a high image quality mode or a low image quality mode (step S56). In the case of high image quality mode, switching is made to continuous voltage application irrespective of the zoom variable magnification as shown in Table 2 (step S57). An exposure is then started (step S58); the program waits for a termination of exposure (step S59); voltage application on the variable configuration mirror is terminated (step S60); and, after the termination thereof, recording of taken image to be kept on the recording medium is effected (step S61). It should be noted that the above described high image quality mode refers to the case of compression rate being a low compression rate in the compression processing or without a compression processing or to the case of image taking using all pixels of the imaging device.

If a low image quality mode is being set at step S56 for determining whether it is a high image quality mode or a low image quality mode, an exposure is started without any change (step S62). Since this case might be a case of long-time exposure, it is then determined whether the exposure has been terminated or not (step S63). When the exposure has been terminated, the program proceeds to step S60 for terminating voltage application on the variable configuration mirror. If the exposure has not been terminated, however, an intermittent voltage application for retaining the configuration of the variable configuration mirror in the subroutine step is effected (step S64). Here, as shown in Table 2, an intermittent voltage application is effected until the termination of exposure at an interval of 0.5 seconds for the case of a wide angle taking where zoom variable magnification Z is $1 \leq Z < 3$ or at an interval of 0.2 seconds for the case of a telephoto taking where it is $3 \leq Z \leq 6$.

Figure 15:
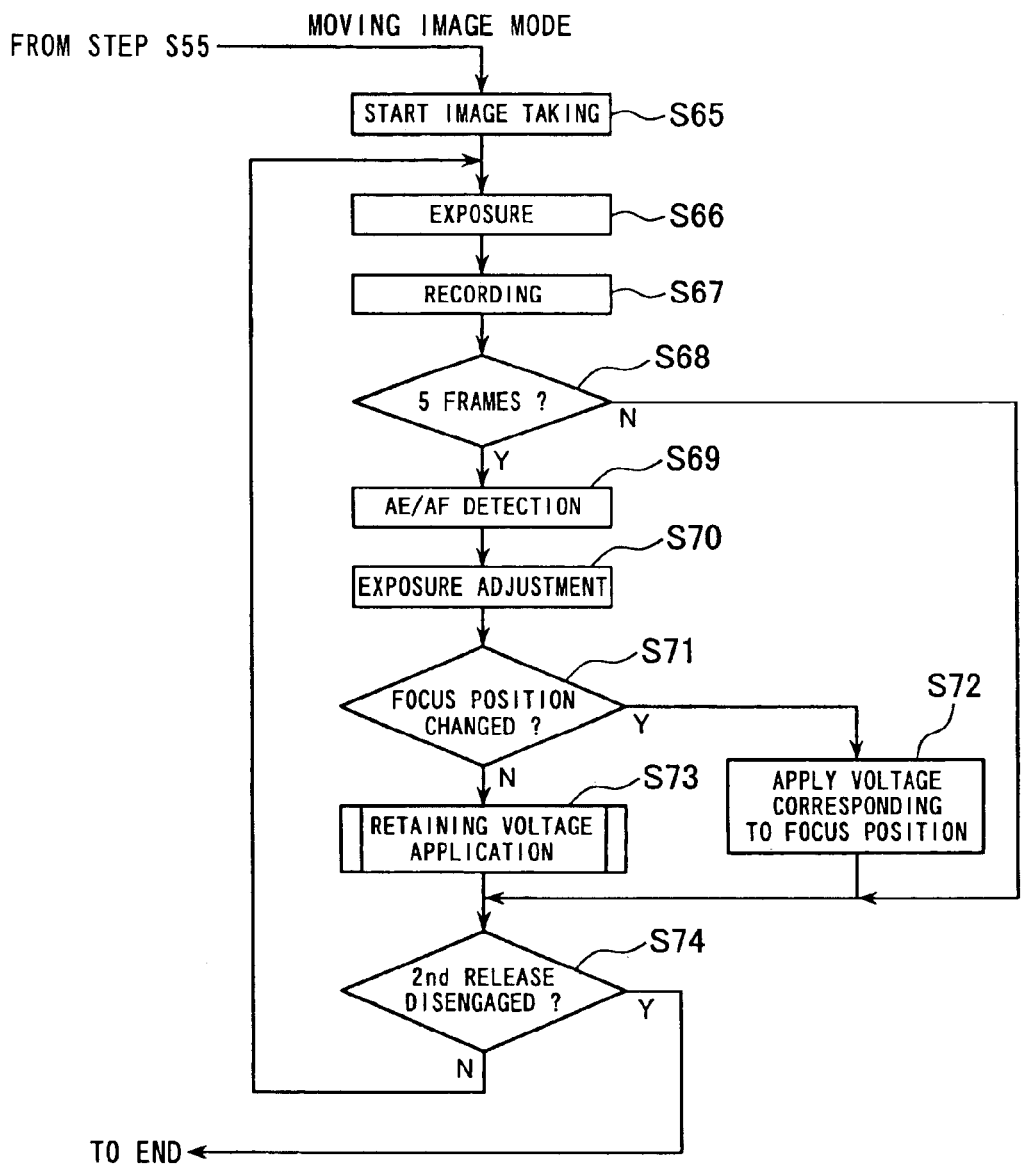
FIG. 15 shows the remaining portion of the flowchart for explaining operation of the second embodiment shown in FIG. 9.

If a moving image mode is being set at the above described step S55 for determining a still image mode or moving image mode, an image taking is started as shown in the flowchart of FIG. 15 (step S65), so as to effect exposure/recording of the first frame (steps S66, S67). Since the taking condition is usually required to be set again at every several frames or so, it is set again once at every 5 frames in this embodiment and determination is thus made as to whether recording of 5 frames of taken image has been completed or not (step S68). If the recording of 5 frames has been completed: detection of AE/AF is effected again (step S69); exposure adjustment is effected as required (step S70); and, in order to change focus position as required, it is determined whether or not to change focus position (step S71). If focus position is to be changed, voltage corresponding to the focus position of the variable configuration mirror is applied (step S72).

If, on the other hand, there is no movement in the object and it is not necessary to change focus position, the program proceeds to a subroutine operation to effect an intermittent voltage application for retaining the configuration of the variable configuration mirror (step S73). In this subroutine operation, then, determination as to whether set timer interval t has elapsed or not is effected similarly to that previously shown in FIG. 16 with respect to step S51. If the set timer interval t has elapsed, voltage is applied again to retain the configuration of the variable configuration mirror. The timer interval (Toff) to be set during such moving image taking is, as shown in Table, an interval of 1.5 sec in the case of wide angle taking where zoom variable magnification Z is $1 \leq Z < 3$ or an interval of 0.7 sec in the case of telephoto taking where zoom variable magnification Z is $3 \leq Z \leq 6$. An intermittent voltage application is effected at such interval.

It should be noted that voltage application for retaining the configuration in this case does not mean an application of voltage again at a point in time after an elapse of predetermined time from a point at which voltage corresponding to change in focus position based on AF detection is applied. On the contrary, it aims at the case where voltage to be applied on the variable configuration mirror is changed without based on AF detection and means the applying of voltage again at a point in time after an elapse of the above described set time from the point at which such change is made. In short, it means the applying of voltage again when a predetermined time shown in Table 2 has elapsed from the point in time of the most recent voltage application.

Subsequently, it is determined whether 2nd release manipulation is disengaged or not (step S74). If 2nd release operation has not been disengaged, the program returns to step S66 to repeat exposure/recording operation. When 2nd release operation has been disengaged, the moving image mode operation is terminated.

In the description of operation based on the above flowchart, voltage application is effected by detecting AE/AF at an interval of 1 sec at the time of LCD image display [through (monitor) image displaying] mode. In the present embodiment, however, it is also possible in the through image displaying mode to change the manner of the intermittent voltage application correspondingly to the remaining amount of battery. Such a manner will now be described. In the present embodiment, it possible at all times to detect the remaining amount of battery by the battery remaining amount detecting section 33. If the remaining amount of battery is relatively large in the through image displaying mode, an intermittent voltage application is effected at a shorter time interval as indicated in Table 2, i.e., at an interval of 2 sec for the wide-angle condition where zoom variable magnification Z is $1 \leq Z < 3$ or at an interval of 1 sec for the telephoto condition where $3 \leq Z \leq 6$. When the remaining amount of battery has become small, the time intervals of intermittent voltage application are made longer to an interval of 3 sec for the wide-angle condition where zoom variable magnification Z is $1 \leq Z < 3$ and an interval of 2 sec for the telephoto condition of $3 \leq Z \leq 6$. It is thereby possible to retain the configuration of the variable configuration mirror while reducing power consumption and achieving a longer life of the battery power supply.

Further, as the manner of applying voltage on the variable configuration mirror, when image is to be taken in the condition of not using a through (monitor) image display (at the time of using an optical finder), it is also possible to consider a mode in which a through image is displayed for a short time period to confirm AF operation and image taking operation. A voltage is applied on the variable configuration mirror only during such through image displaying for the short time period and no voltage is applied in other periods.

Furthermore, while the setting of timer intervals (Toff) for each operation mode of which an example has been shown in Table 2 can be previously stored to CPU in the form of a look-up table, it is also possible to allow the photographer to arbitrarily set or select these timer intervals correspondingly to each operation mode.

Figure 17:
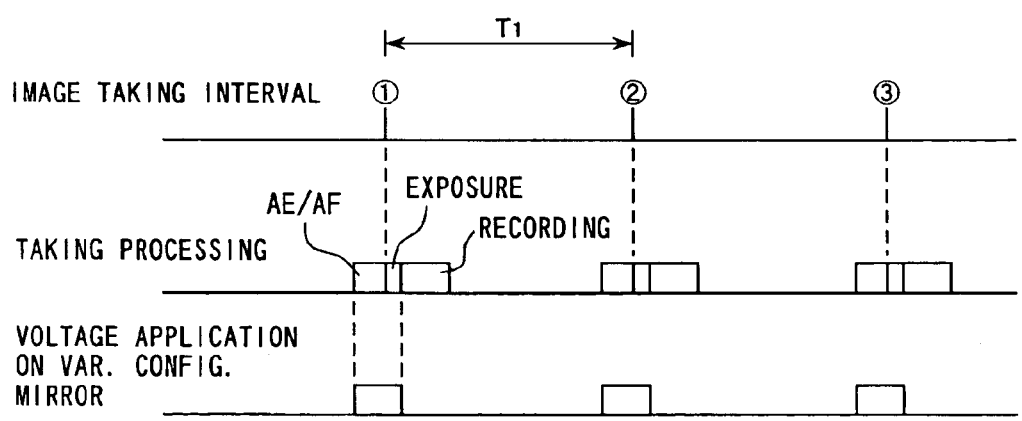
FIG. 17 is a timing chart showing the manner of image taking processing and the manner of voltage application on the variable configuration mirror at the time of an interval image taking.

With a digital camera, there are cases in which pictures are taken in the manner of so-called interval taking which is different from consecutive image taking. The manner of applying voltage on the variable configuration mirror at the time of such interval image taking will now be described by way of FIG. 17. In the interval image taking, images are intermittently taken such as in the order of frame ①, frame ②, ..., at a previously set, predetermined taking interval $T_1$ (for example at intervals of one minute). At the time of taking processing of each frame, AE/AF processing is first effected, which is followed by the effecting of exposure and the recording of taken image. At that time, the voltage application on the variable configuration mirror used in focal point adjustment of the optical system thereof is effected for the duration of AE/AF processing period and the following exposure period, and the application of voltage is interrupted for the time period including the recording time, until the start of AE/AF processing of the next image taking. Thereby the power saving effect can be increased.

It should be noted that, while a digital camera has been described as the foregoing embodiments, the present invention can also be applied to a camera unit which is incorporated for example into a mobile phone.

What is claimed is:

1. An imaging apparatus comprising:
    a variable configuration mirror provided with a reflecting surface for changing optical path and a plurality of electrodes on which voltage is applied to change the configuration of said reflecting surface;

an image taking section having the variable configuration mirror as a part of an optical system thereof; and a control section for driving said variable configuration mirror by applying voltages only on one part of the plurality of electrodes provided on said variable configuration mirror.

2. An imaging apparatus comprising:

a variable configuration mirror provided with a reflecting surface for changing optical path and a plurality of electrodes on which voltage is applied to change the configuration of said reflecting surface;

an image taking section having the variable configuration mirror as a part of an optical system thereof; and a control section for selectively effecting control for driving said variable configuration mirror by applying voltages only on one part of the plurality of electrodes provided on said variable configuration mirror or control for driving said variable configuration mirror by applying voltages on all of the plurality of electrodes provided on said variable configuration mirror;

wherein said control section drives said variable configuration mirror in a manner chosen between the partial-electrode voltage application and the all-electrode voltage application.

3. The imaging apparatus according to claim 2, wherein said control section drives the variable configuration mirror by applying voltages only on a part of the electrodes at the time of a specific operation of the imaging apparatus.

4. The imaging apparatus according to claim 3, wherein said variable configuration mirror is to adjust focus in said image taking section correspondingly to the configuration of said reflecting surface and wherein the time of said specific operation is the time of a detecting operation for detecting focus position while varying the configuration of the reflecting surface of said variable configuration mirror.

5. The imaging apparatus according to claim 3, wherein the time of said specific operation is the time during which the imaging apparatus is in at least one of a through (monitor) image displaying or a moving image taking.

6. The imaging apparatus according to claim 2, wherein said control section applies voltages only on a part including at least a center electrode of said plurality of electrodes when the drive control is to be effected by applying voltages only on a part of the electrodes.

7. The imaging apparatus according to claim 2, wherein said control section drives said variable configuration mirror by applying voltages on all the electrodes when taking image.

8. The imaging apparatus according to claim 3, wherein said control section drives said variable configuration mirror by applying voltages on all the electrodes when taking image.

9. The imaging apparatus according to claim 4, wherein said control section drives said variable configuration mirror by applying voltages on all the electrodes when taking image.

10. The imaging apparatus according to claim 5, wherein said control section drives said variable configuration mirror by applying voltages on all the electrodes when taking static image.

11. The imaging apparatus according to claim 4, wherein, when an instruction for start of image taking is given after focus position is detected by voltage application only on said part of the electrodes, said control section drives said variable configuration mirror by applying voltages on all the electrodes so as to result in said detected focus position.

12. The imaging apparatus according to claim 6, wherein, when an instruction for start of image taking is given after focus position is detected by voltage application only on said part of the electrodes, said control section drives said variable configuration mirror by applying voltages on all the electrodes so as to result in said detected focus position.

13. The imaging apparatus according to claim 7, wherein, when an instruction for start of image taking is given after focus position is detected by voltage application only on said part of the electrodes, said control section drives said variable configuration mirror by applying voltages on all the electrodes so as to result in said detected focus position.

14. The imaging apparatus according to claim 8, wherein, when an instruction for start of image taking is given after focus position is detected by voltage application only on said part of the electrodes, said control section drives said variable configuration mirror by applying voltages on all the electrodes so as to result in said detected focus position.

15. The imaging apparatus according to claim 9, wherein, when an instruction for start of image taking is given after focus position is detected by voltage application only on said part of the electrodes, said control section drives said variable configuration mirror by applying voltages on all the electrodes so as to result in said detected focus position.

16. A controlling method of imaging apparatus including a variable configuration mirror provided with a reflecting surface for changing optical path and a plurality of electrodes on which voltage is applied to change the configuration of said reflecting surface, and an image taking section having the variable configuration mirror as a part of an optical system thereof, said controlling method of imaging apparatus comprising a step of:

effecting control by applying voltages only on one part of the plurality of electrodes provided on said variable configuration mirror.

17. A controlling method of imaging apparatus including a variable configuration mirror provided with a reflecting surface for changing optical path and a plurality of electrodes on which voltage is applied to change the configuration of said reflecting surface, and an image taking section having the variable configuration mirror as a part of an optical system thereof for use in focusing, said controlling method of imaging apparatus comprising steps of:

effecting control by applying voltages only on a part of said plurality of electrodes at the time of focusing; and effecting control by applying voltages on all of said plurality of electrodes at the time of taking image.

18. An imaging apparatus comprising:

a variable configuration mirror provided with a reflecting surface for changing optical path and a plurality of electrodes on which voltage is applied to change the configuration of said reflecting surface;

an image taking section having the variable configuration mirror as a part of an optical system thereof;

a plurality of drive sections for applying voltages on the plurality of electrodes provided on said variable configuration mirror; and a control section for effecting control so as to apply a voltage commonly to at least two electrodes of said plurality of electrodes by at least one drive section of the plurality of drive sections.

19. The imaging apparatus according to claim 18, wherein said control section, during the time of a specific operation of the imaging apparatus, effects control so as to apply a voltage on all the electrodes of said plurality of electrodes by one drive section of the plurality of drive sections.

20. The imaging apparatus according to claim 19, wherein the time of said specific operation is the time during which said image taking section is being adjusted of focus by change in the configuration of the reflecting surface of said variable configuration mirror.

21. An imaging apparatus comprising:
- a variable configuration mirror provided with a reflecting surface for changing optical path and a plurality of electrodes on which voltage is applied to change the configuration of said reflecting surface;
- an image taking section having the variable configuration mirror as a part of an optical system thereof;
- a plurality of drive sections for applying voltages on the plurality of electrodes provided on said variable configuration mirror; and
- a control section for conditionally selecting the drive sections corresponding to each electrode of said plurality of electrodes.

22. The imaging apparatus according to claim 21, wherein, depending on at least one of zoom ratio or image taking mode or recording resolution set of the imaging apparatus, said control section switches drive section for at least one electrode from the usual drive section of the one electrode to the usual drive section of another electrode so as to drive a plurality of electrodes by using the drive section of the another electrode.

23. A controlling method of imaging apparatus including a variable configuration mirror provided with a reflecting surface for changing optical path and a plurality of electrodes on which voltage is applied to change the configuration of said reflecting surface, and an image taking section having the variable configuration mirror as a part of an optical system thereof, said controlling method of imaging apparatus comprising a step of:
- effecting control so as to apply a voltage commonly on at least two electrodes of the plurality of electrodes provided on said variable configuration mirror.

24. A controlling method of imaging apparatus including a variable configuration mirror provided with a reflecting surface for changing optical path and a plurality of electrodes on which voltage is applied to change the configuration of said reflecting surface, and an image taking section having the variable configuration mirror as a part of an optical system thereof for use in focusing, said controlling method of imaging apparatus comprising steps of:
- effecting control so as to apply a voltage commonly on at least two electrodes of said plurality of electrodes at the time of focusing; and
- effecting control so as to apply a voltage independently on each of all of said plurality of electrodes at the time of taking image.

25. An imaging apparatus comprising:
- a variable configuration mirror having a reflecting surface capable of being changed in configuration by an application of voltage;
- an image taking section having the reflecting surface of the variable configuration mirror as a constituent part of an optical system thereof;
- a voltage applying section for applying voltage on said variable configuration mirror; and
- a configuration retaining control section for controlling said voltage applying section so as to retain the reflecting surface of said variable configuration mirror to a certain configuration.

26. The imaging apparatus according to claim 25, wherein said configuration retaining control section controls said voltage applying section so that the voltage is intermittently applied on the variable configuration mirror to retain the configuration of the reflecting surface of said variable configuration mirror.

27. The imaging apparatus according to claim 26, wherein said configuration retaining control section controls said voltage applying section so that an application time interval of said intermittent voltage application is changed in accordance with a zoom variable power set at said image taking section.

28. The imaging apparatus according to claim 27, wherein said configuration retaining control section controls said voltage applying section so that, in the case where said set zoom variable power is relatively low, the application time interval of said intermittent voltage application is longer as compared to the case where a relatively high zoom variable power is set.

29. The imaging apparatus according to claim 26, wherein said configuration retaining control section controls said voltage applying section so that the application time interval of said intermittent voltage application is changed in accordance with an image taking mode of the imaging apparatus.

30. The imaging apparatus according to claim 29, wherein said configuration retaining control section controls said voltage applying section so that the application time interval of said intermittent voltage application in a moving image taking mode is longer as compared to that in a still image taking mode.

31. The imaging apparatus according to claim 26, wherein said configuration retaining control section controls said voltage applying section so that, when a remaining battery amount of a battery provided in the imaging apparatus is lower than a predetermined amount, the application time interval of said intermittent voltage application is longer as compared to the case where it is higher than the predetermined amount.

32. The imaging apparatus according to claim 25, wherein said configuration retaining control section effects control by making a selection in accordance with an operating condition of the imaging apparatus as to which one of an intermittent voltage application or a continuous voltage application is to be caused by said voltage applying section.

33. The imaging apparatus according to claim 32, wherein said configuration retaining control section controls said voltage applying section so as to cause the intermittent voltage application in the period during which the imaging apparatus displays a through (monitor) image on a display section.

34. The imaging apparatus according to claim 32, wherein said configuration retaining control section controls said voltage applying section so as to cause the intermittent voltage application when the imaging apparatus is taking a moving image.

35. The imaging apparatus according to claim 32, wherein said configuration retaining control section controls said voltage applying section so as to cause the continuous voltage application when the imaging apparatus is taking image in a high image quality mode.

36. The imaging apparatus according to claim 34, wherein said configuration retaining control section controls said voltage applying section so as to cause the continuous voltage application when the imaging apparatus is taking image in a high image quality mode.

37. The imaging apparatus according to claim 35, wherein said configuration retaining control section controls said voltage applying section so as to cause the intermittent voltage application until start of an exposure after a focus lock and cause the continuous voltage application during the exposure.

38. The imaging apparatus according to claim 36, wherein said configuration retaining control section controls said voltage applying section so as to cause the intermittent voltage application until start of an exposure after a focus lock and cause the continuous voltage application during the exposure.

39. The imaging apparatus according to claim 26, wherein said variable configuration mirror is used in adjusting a focal point position of said image taking section.

40. The imaging apparatus according to claim 26, wherein said variable configuration mirror is capable of changing configuration of said reflecting surface by an electrostatic force.

41. The imaging apparatus according to claim 39, wherein said variable configuration mirror is capable of changing configuration of said reflecting surface by an electrostatic force.

42. An imaging apparatus comprising:
- a variable configuration mirror having a reflecting surface capable of being changed in configuration by an application of voltage;
- an image taking section having the reflecting surface of the variable configuration mirror as a constituent part of an optical system thereof;
- a voltage applying section for applying voltage on said variable configuration mirror; and
- a control section for controlling said voltage applying section so as not to apply voltage on the variable configuration mirror between each image taking when the imaging apparatus is in an interval image taking condition.

43. A controlling method of imaging apparatus including a variable configuration mirror having a reflecting surface capable of being changed in configuration by an application of voltage, an image taking section having the reflecting surface of the variable configuration mirror as a constituent part of an optical system thereof, and a voltage applying section for applying voltage on said variable configuration mirror, said controlling method of imaging apparatus comprising a step of:
- controlling said voltage applying section so as to intermittently apply voltage to retain the reflecting surface of said variable configuration mirror to a certain configuration.

* * * * *